United States Patent [19] [11] 3,672,611
Thorne-Booth [45] June 27, 1972

[54] VEHICLE CONTROL SYSTEM AND METHOD
[72] Inventor: George M. Thorne-Booth, Tarzana, Calif.
[73] Assignee: Westinghouse Electric Corporation, Pittsburgh, Pa.
[22] Filed: Dec. 3, 1970
[21] Appl. No.: 94,849

[52] U.S. Cl. .............................................. 246/28 R, 246/77
[51] Int. Cl. ........................................................ B61l 23/26
[58] Field of Search ................... 246/160, 29, 34 R, 28 R, 77; 340/38 R

[56] References Cited

UNITED STATES PATENTS 2,994,764  8/1961   Witmer et al. ........................ 246/28 R
2,975,272  3/1961   Renick et al. ......................... 246/34 R Primary Examiner—Arthur L. La Point
Assistant Examiner—George H. Libman
Attorney—F. H. Henson and R. G. Brodahl

[57] ABSTRACT

A path along which a vehicle traverses is divided into a plurality of blocks. In each block two devices sense the presence of a vehicle, and one of the devices is used to sense the absence of the vehicle. The two devices concurrently sensing the presence of a vehicle provide a presence signal to be stored which is indicative of a vehicle having been present in the block. In response to the sensing of the absence of the vehicle by the one device during the time the presence signal is stored, a control signal is generated. A predetermined amount of time after the control signal is generated the storage of the presence signal is discontinued.

9 Claims, 8 Drawing Figures

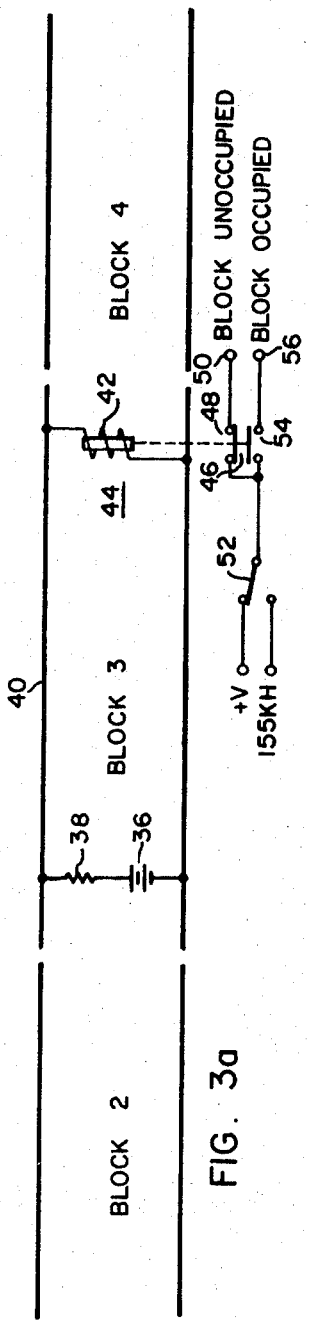
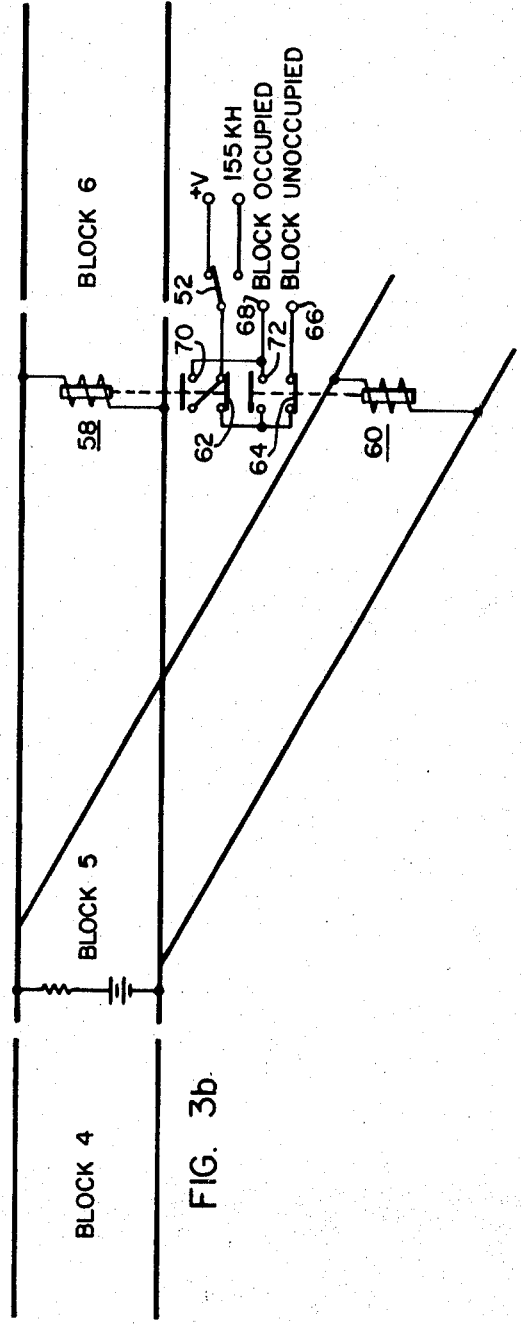
FIG. 3a
FIG. 3b

VEHICLE CONTROL SYSTEM AND METHOD

CROSS REFERENCE TO RELATED APPLICATIONS

Reference is made to a copending patent application Ser. No. 780,662 and filed Dec. 3, 1968 by George M. Thorne-Booth.

BACKGROUND OF THE INVENTION

In any vehicle position control and monitoring system, the path taken by a vehicle is usually divided into a plurality of control blocks. The presence or absence of a vehicle in a given control block is monitored, and related presence signals are generated, depending on the presence or absence of a vehicle in that given control block. The presence signals are utilized for performing any one of a number of desired control functions. For example vehicle speed control signals may be generated to govern the speed of a vehicle traversing a previous control block or, the vehicle presence signal may be used for control operation interlocking purposes.

When the vehicle presence signals are used for interlocking purposes, they may be used to control the unlocking of track or signal switches, closing of doors or tunnels, clearing signals for cross-over tracks, or any of a number of other interlocking functions.

The generation of a presence signal tells the control system that a vehicle has occupied a given control block, and that the control block is now no longer so occupied. In a typical prior art vehicle control system, and particularly where steel rails are used, the presence of a vehicle is detected by the vehicle in effect electrically short-circuiting a signal present in the rails, and conversely the absence of a vehicle in a given control block is detected by the presence of the provided signal in the rails of that control block. The latter prior art type of vehicle detection system does not have desirable fail-safe operational properties, in that broken wires, battery or relay device failures and so forth can give a false indication that a vehicle has gone through and is no longer present in a given control block, when such may not be the actual situation. In such an instance, a following vehicle may come into the given control block at a high rate of speed and result in a collision or derailment of either one or both vehicles present within the same control block.

A fail-safe and more reliable system and method are needed for more assuredly determining that a given control block has been occupied and is no longer occupied, before a control signal is generated to permit a following vehicle to enter that same control block.

In accordance with the teachings of the present invention there is provided a system and method which use two devices to determine that a given control block has been occupied by a first vehicle and subsequently is no longer occupied, before a control signal is generated to permit a second and subsequent vehicle to enter that same control block.

SUMMARY OF THE INVENTION

A vehicle control system and method is disclosed operative with a vehicle traversing a path divided into a plurality of control blocks. There are provided first control apparatus for sensing when the vehicle is within a given control block, and second control apparatus for sensing the presence or absence of the vehicle within the given control block. A third control apparatus is responsive to the sensing of the presence of a vehicle by the first control apparatus concurrent with the second control apparatus sensing the presence of the vehicle for storing a first presence signal indicative of the vehicle having been present in the given control block. A fourth control apparatus provides a control signal in response to the second control apparatus sensing the absence of the vehicle in said given block during the time the first presence signal is stored.

DESCRIPTION OF THE DRAWINGS

FIGS. 3a and 3b are schematic representations of vehicle path or track circuits which may be used in the practice of the present invention.

DESCRIPTION OF PREFERRED EMBODIMENT

Figure 1:
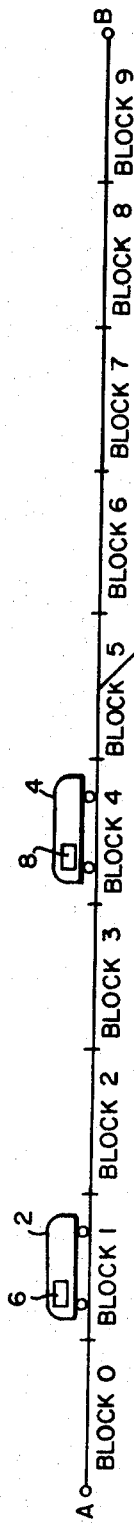
FIG. 1 is a diagrammatic illustration of typical vehicle paths, divided into a plurality of control blocks and along which vehicles may traverse.

FIG. 1 illustrates two vehicle travel paths, which are divided into a plurality of control blocks, and along which vehicles such as train vehicles 2 and 4 may traverse. The trains may be comprised of one or more vehicle cars, and at least one of the vehicle cars contains a signal transmitter, as shown at 6 and 8. One possible travel path a vehicle may take is from the point A to the point B, and the other possible path is from the point A to the point C. It is to be understood, however, that more complex vehicle paths may be constructed.

If the vehicle 4 is to travel along the path from A to C, and the vehicle 2 is to travel along the path from A to B, it must be definitely ascertained that the vehicle 4 has occupied and subsequently left control block 5 before the rails in control block 5 are switched such that the subsequent vehicle 2 is allowed to enter control block 5. This is accomplished by providing a control signal for locking the rails of control block 5 in a desired switch position for the above cited example. It is to be understood, however, that the control signal provided may be used for any of a number of other suitable vehicle control and signal purposes and is not limited to the example cited.

Figure 2:
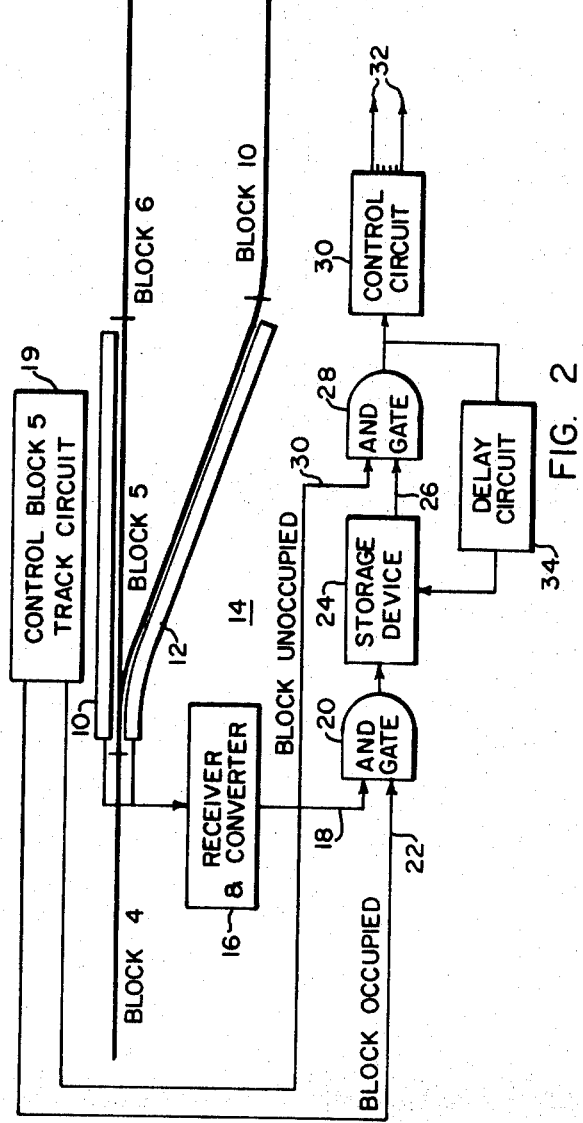
FIG. 2 is a schematic illustration embodying the teachings of the present invention.

FIG. 2 is a circuit illustration embodying the teachings of the present invention. Antennas 10 and 12 are positioned adjacent to and substantially along the length of control block 5 for sensing a signal transmission from the transmitter of a vehicle as the vehicle travels through control block 5 from the points A to B as compared to the alternate path from A to C, respectively. Antennas similar to those illustrated are situated relative to the other control blocks, but are not specifically shown. Each control block also contains standard and well known track circuits for sensing the presence or absence of a vehicle in a given control block, as is explained in greater detail in conjunction with FIGS. 3a and 3b. In addition there is provided a logic circuit, such as the logic circuit 14, operative with each control block; however only the logic circuit 14 operative with control block 5 is specifically shown.

Whenever at least one of the antennas 10 or 12 receives a presence signal transmission from a vehicle traveling through control block 5, this presence signal is coupled to a suitable signal receiver and converter 16 which converts the received presence signal to a pulse suitable for enabling a gate 20. The presence pulse is applied through line 18 to a first input of a gate 20. The track circuit 19 operative with control block 5 also senses the presence of the vehicle at this time and a block occupied signal is transmitted through line 22 to a second input of the gate 20. When both inputs are simultaneously energized, the gate 20 provides an output pulse in response to signals being concurrently produced on the input lines 18 and 22. The output pulse from gate 20 causes a storage device 24 to store a signal indicative of a vehicle having definitely been present in block 5. The latter stored signal is applied through a line 26 to the first input of a gate 28. The second input to the gate 28 is a block unoccupied signal which is applied through a line 30 from the track circuit 19 of control block 5. The block unoccupied signal is generated whenever a vehicle is not sensed to be present in the control block by the track circuit 19.

Assume the previously sensed vehicle has left control block 5 and a block unoccupied signal is now applied to gate 28. Storage device 24 is at this time still storing a presence signal indicative of a vehicle having been in control block 5, therefore, the presence of the stored signal on line 26 concurrent with the provision of the block unoccupied signal on line 30 causes gate 28 to provide a control signal. The latter control signal is indicative of the sequence of events whereby a vehicle has been in, and subsequently has left control block 5. This control signal from gate 28 is applied to the control circuit 30, which responds to this control signal to accomplish several desired functions. For example, one output signal on one of the output lines 32 may be utilized for locking in a first position the tracks in control block 5, an output signal on another output line 32 is for the control of lift bridges in control block 5, another output signal can be utilized for closing doors on tunnels in block 5, or any other desired vehicle control function, for other vehicles.

The control signal from gate 28 is also applied to a second input of storage device 24 through a delay circuit 34. This delayed signal causes the storage device 24 to discontinue the storage of the presence signal indicative of control block 5 having been occupied. The effective delay time, $\Delta t$, of delay circuit 34 is chosen to be of a duration sufficient for the control circuit 30 to respond to the control signal from gate 28. The system operational timing is shown in greater detail, in conjunction with the embodiments of FIGS. 4 and 6.

Figure 4:
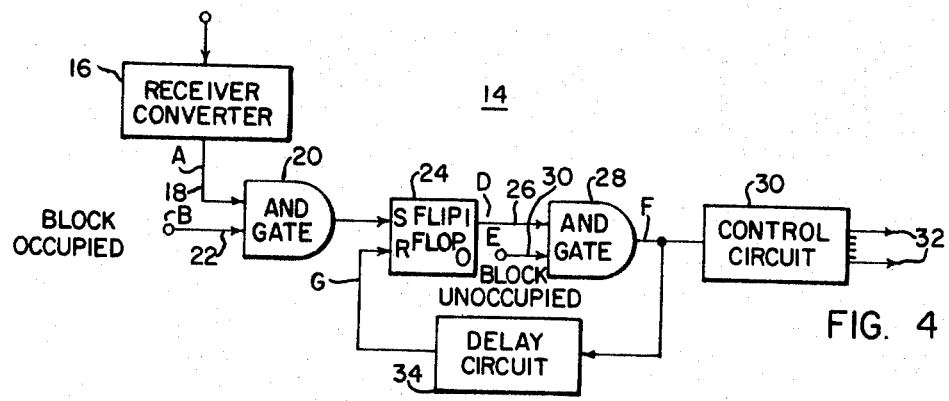
FIG. 4 is a schematic diagram to illustrate a feature of the present invention.
Figure 6:
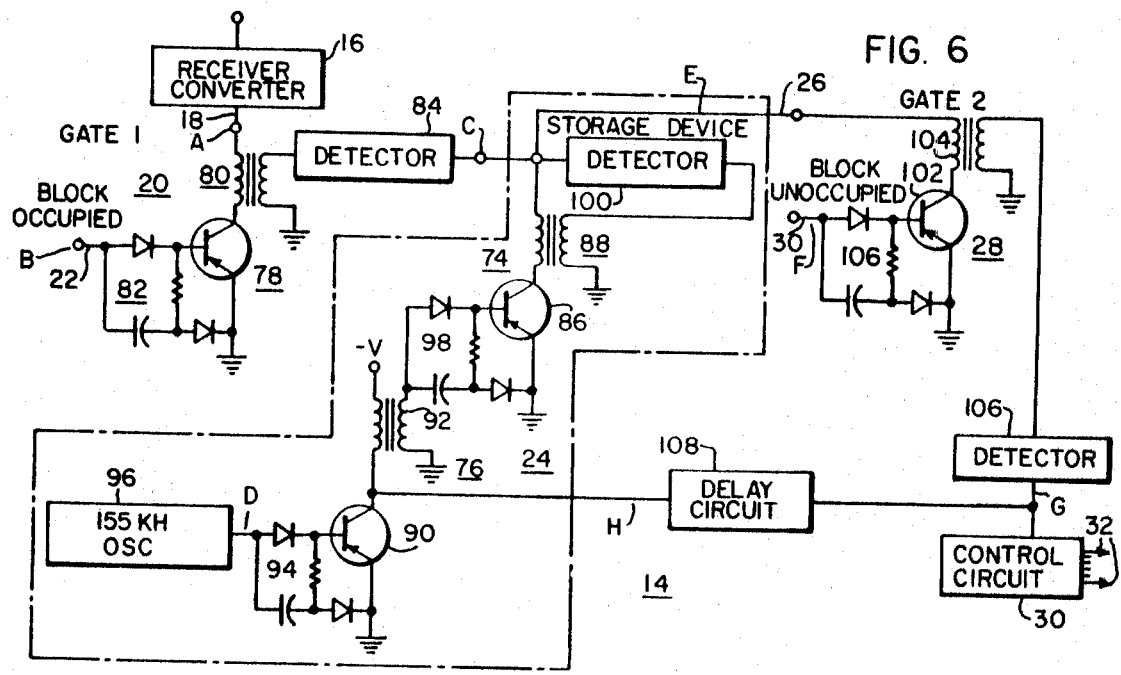
FIG. 6 is a schematic diagram embodying a modification of the present invention.

In reference to FIGS. 3a and 3b, which schematically illustrate one of any number of suitable track circuit arrangements which may be used in the practice of the present invention. In FIG. 3a the track circuit for control block 3 is illustrated in detail. A battery 36 supplies current through a resistor 38 to the track rail 40. In the absence of a vehicle in control block 3, the current flows through the coil 42 of relay 44 and back to the battery 36 to energize the relay 44. An arm 46 of the relay 44 engages a contact 48 providing a block unoccupied signal at the terminal 50. This is the type of signal which was previously described as being applied to the second input of the gate 28 through the line 30 (FIG. 2). This unoccupied signal may be either one of a direct current (d.c.) or alternating current (a.c.) signal, such as may be selected by a switch 52. The d.c. signal (+V) is selected when a logic circuit 14 as illustrated in FIG. 4 is used in the practice of the present invention, and the a.c. signal, (155 kc), is selected when a logic circuit 14 as illustrated in FIG. 6 is used in the practice of the present invention. This is explained in detail later.

As is well known, when a vehicle enters block 3, the wheels short out the current to the coil 42 deenergizing relay 44 and arm 46 then engages contact 54 providing a block occupied signal at terminal 56. This is the type signal which was applied via line 22 to the second input of the gate 20 (FIG. 2).

FIG. 3b illustrates the typical track circuit utilized with control block 5. Since control block 5 contains two alternate travel paths to which the track rails may be switched, two relays 58 and 60 respectively are required. Arm 62 is controlled by relay 58 and arm 64 is controlled by relay 60. The relays 58 and 60 are shown in the energized condition which is indicative of a vehicle not being present in either track rail section of control block 5, therefore a block unoccupied signal is provided at terminal 66. It may be seen that if a vehicle is present in either of the track rail sections of control block 5, a block occupied signal is provided at terminal 68 through contact 70 or 72, dependent upon whether relay 58 or 60, respectively, is deenergized.

In reference to FIG. 4, in which standard logic circuits are shown to form the logic circuit 14. That is, gates 20 and 24 are standard AND gates, and storage device 24 is a well known set-reset flip-flop device. At a time $t_o$ receiver converter 16 begins to sense a presence signal transmission resulting from a vehicle entering a given control block, for example block 5 (FIG. 2). The receiver-converter 16 continues to receive the presence signal or block occupied signal from the vehicle until a time $t_1$ when the vehicle leaves the control block. The pulse produced by the converter 16 during the interval $(t_o-t_1)$ is applied through line 18 to the first input of gate 20 (a wave form A shown in FIG. 5). During substantially the same time interval $(t_o-t_1)$ the track circuits of block 5 sense the presence of the vehicle, and a block occupied signal is transmitted to the second input of the gate 20 through line 22 (waveform B shown in FIG. 5). In response to the concurrent production of the signals at the respective two inputs of the gate 20, a pulse is produced at the output of the gate 20 (waveform C shown in FIG. 5), which sets the set-reset flip-flop device 24 to the ONE state. Flip-flop 24 is now storing a signal indicative of a vehicle having been present in control block 5 (waveform D shown in FIG. 5).

Figure 5:
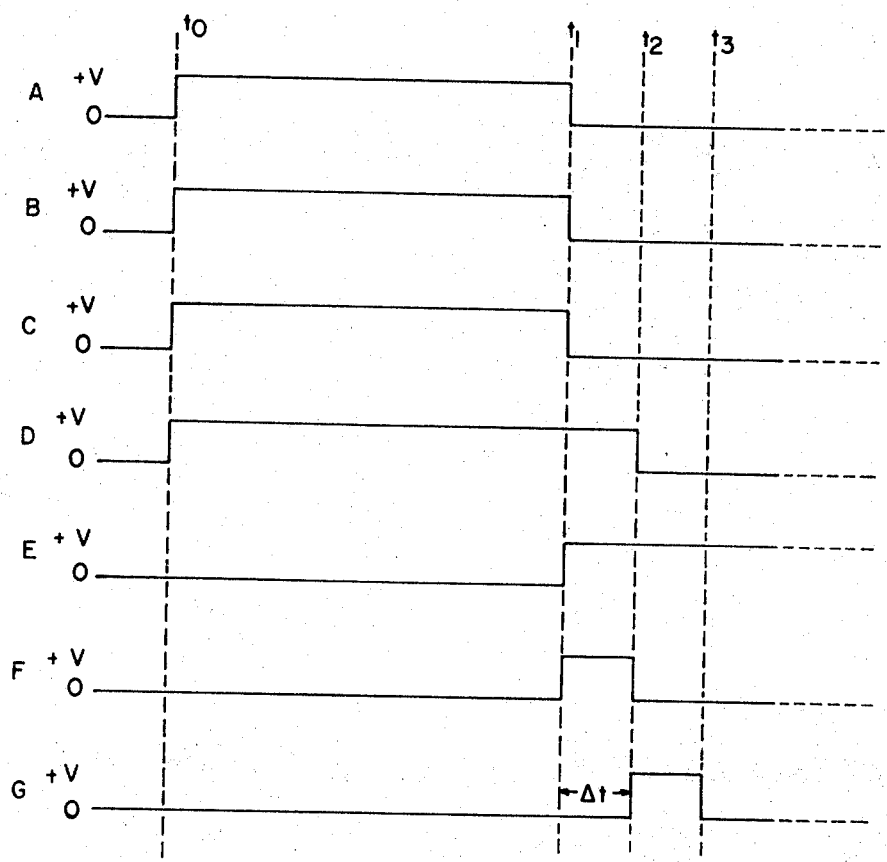
FIG. 5 is a group of waveforms helpful in understanding the illustration of FIG. 4.

Substantially at time $t_1$, the track circuit of control block 5 senses the vehicle is no longer in block 5, to result in a block unoccupied signal being applied through line 30 to the second input of AND gate 28 (waveform E, FIG. 5). Since the first input of the gate 28 is connected to the ONE output signal of flip-flop 24, AND gate 28 produces an output control signal (waveform F, FIG. 5) which is indicative of a vehicle having been in, and subsequently having left block 5. The latter control signal is applied to the control circuit 30, which is operative to perform any desired control functions associated with control block 5, as was explained above; this same control signal is also applied to the reset terminal of flip-flop 24 through delay circuit 34, a predetermined amount of time $(\Delta t = t_2 - t_1)$ after the control signal has been generated, which application is at a time $t_2$ (waveform G, FIG. 5). The logic circuit 14 is now in condition to sense the presence of another and subsequent vehicle entering control block 5.

FIG. 6 illustrates the operation of a modified logic circuit 14, utilizing fail-safe AND gates as the respective gates 20 and 28. These particular fail-safe AND gates are disclosed in greater detail in the copending patent application filed on behalf of George M. Thorne-Booth and entitled "Family of Circuits for Use as Failsafe Logic Gates or Electronic Relays." Ser. No. 780,662 filed Dec. 3, 1968. Two more of this same type of fail-safe AND gates 74 and 76, respectively, are used to form the storage device 24.

In reference to the schematic diagram of FIG. 6, as receiver-converter 16 receives a signal transmission from a vehicle entering block 5 at a time $t_o$, the receiver converter 16 applies a pulse of negative potential (waveform A, FIG. 7) to a first input of gate 82, which is the collector of transistor 78, through the primary of transformer 80. This negative potential pulse serves as operating potential for the transistor 78. The receiver-converter 16 continues to receive the presence or block occupied signal from the vehicle until a time $t_1$ when the vehicle leaves control block 5. The pulse produced by the receiver-converter during the interval $(t_1$ minus $t_o)$ maintains operating potential during this same time interval for the transistor 78.

Figure 7:
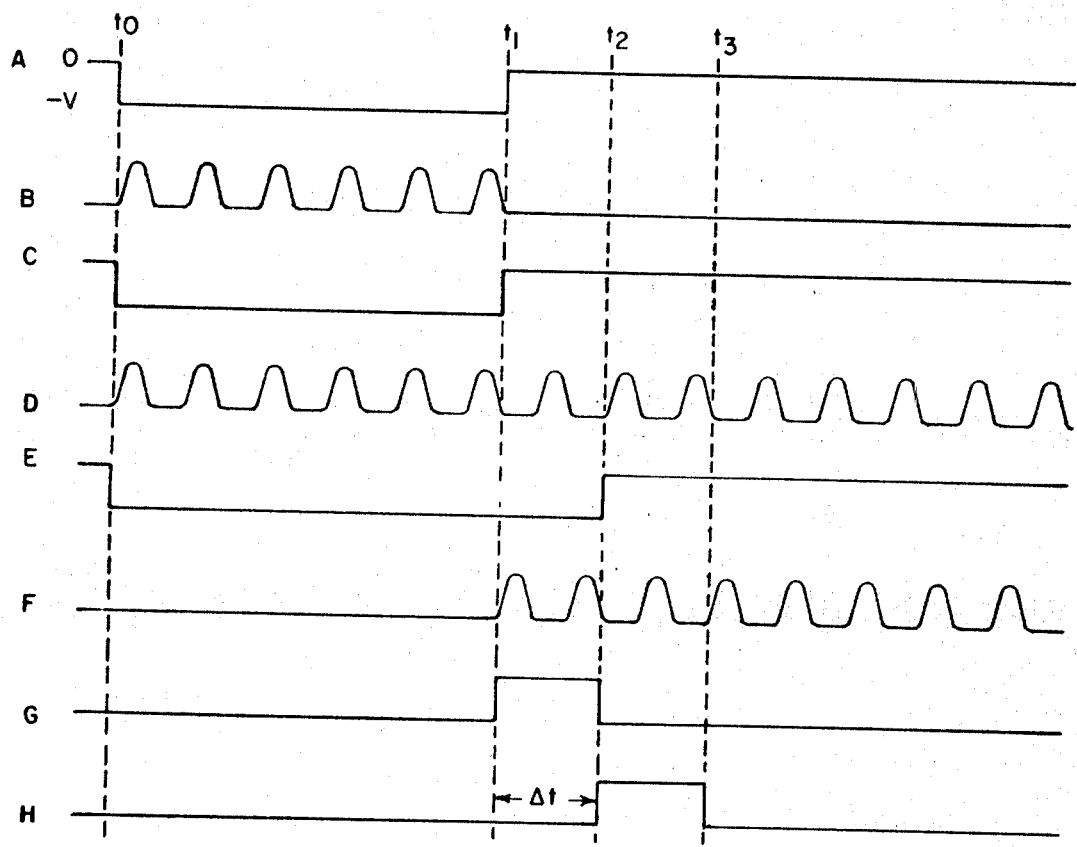
FIG. 7 is a group of waveforms helpful in understanding the illustration of FIG. 6.

During substantially the same time interval $(t_1$ minus $t_o)$ the track circuits of control block 5 sense the presence of the vehicle and a 155 kc block occupied signal is transmitted to the second input of the gate 82, which is the base of transistor 78, through the line 22 (waveform B, FIG. 7). In response to the concurrent application of operating potential to the collector of transistor 78 and the application of the 155 kc signal to the base of transistor 78 via a level-shifting network 82, the 155 kc gate output signal is substantially reproduced across the secondary of transformer 80. A detector 84, detects this signal across the secondary and provides a negative pulse (waveform C, FIG. 7) which serves as operating potential applied to one input of the fail-safe AND gate 74. The latter negative pulse is coupled to the collector of transistor 86 of AND gate 74 through the primary of a transformer 88, for providing operating potential for transistor 86.

The AND gate 76 is comprised of a transistor 90 which has a substantially constant operating potential (of $-V$) applied to the collector of transistor 90 through the primary winding of transformer 92. A signal of 155 kc is applied to the base of transistor 90 through a level shifting network 94 from a source 96 (waveform D, FIG. 7). The 155 kc signal is essentially reproduced across the secondary of the transformer 92 and applied to the base of transistor 86 through a level shifting network 98. Since operating potential is being applied to the collector of transistor 86, as was explained above, the 155 kc signal is essentially produced across the secondary of transformer 88. This signal is detected by detector 100 which applys a negative pulse to the primary of transformer 88, thereby maintaining operating potential on the collector of transistor 86 (waveform E, FIG. 7). This negative pulse is also applied to the first input of AND gate 28 through line 26, and serves as operating potential for gate 28. This latter operating potential is applied to the collector of transistor 102 through the primary of the transformer 104.

At time $t_1$ the vehicle leaves control block 5, and at this time a block unoccupied signal of 155 kc (waveform F, FIG. 7) is applied, from the track circuit associated with control block 5, to the second input of gate 28 via line 30. This 155 kc signal is applied to the base of transistor 102 through a level shifting network 106. Since there is operating potential applied to the collector of transistor 102 at this time, as was explained above, the 155 kc signal is essentially provided across the secondary of transformer 104. This latter signal is detected by a detector 106 which provides a positive control signal (waveform G, FIG. 7) to the control circuit 30, which operates to provide suitable and desired control signals to the control block 5 through the lines 32.

The control signal from detector 106 is then applied to a delay circuit 108 which delays the control signal for a predetermined amount of time, $\Delta t$, before it is applied at time $t_2$ to the collector of transistor 90 (waveform H, FIG. 7). This positive signal essentially removes operating potential from transistor 90, which removes the 155 kc signal from the secondary of transformer 92 and in turn from the base of transistor 86. This results in the loss of the 155 kc signal across the secondary of transformer 88 and the negative operating potential from detector 100 which is applied to the collector of transistor 86. Since there is no vehicle in control block 5 at this time, there is no negative output from detector 84 and transistor 86, therefore, has no source of operating potential.

At a time $t_3$ (waveform H, FIG. 7) the delayed pulse returns to a zero level and transistor 90 is again supplied operating potential from the source $-V$ through the primary of transformer 92. Since the source 96 is continuously applying the 155 kc signal to the base of transistor 90, the 155 kc signal is essentially reproduced at this time across the secondary of transistor 92 and applied to the base of transistor 86, which has no operating potential applied to it at this time as was explained above (see time $t_3$, waveforms C and E, of FIG. 7). The circuit shown in FIG. 6 is now in condition to sense the presence of another and succeeding vehicle entering control block 5.

In summary, a vehicle control system and method have been described for sensing the presence of a vehicle in a given control block by a first operational apparatus, concurrent with the sensing of the presence of that same vehicle in the given control block by a second operational apparatus. A presence or block occupied signal is stored in response to the first and second operational apparatus concurrently sensing the presence of the vehicle within the given control block. A control signal is provided in response to the second apparatus sensing the absence of the vehicle in the given control block during the time the block occupied signal is stored.

I claim:

1. In a vehicle control system operative when a vehicle traverses along a path divided into a plurality of control blocks, the combination comprising:
   means for providing a first signal in response to the presence of said vehicle within a given control block;
   means for providing a second signal in response to the presence of said vehicle within said given control block;
   means responsive to the concurrent provision of said first and second signals for providing a first control signal;
   means for storing said first control signal; and
   means responsive to the sensing of the absence of said vehicle within said given control block during the time said first control signal is stored for providing a second control signal for controlling the traversal of other vehicles along said path.

2. In a system wherein a vehicle traverses a path divided into a plurality of control blocks, the combination comprising:
   first means for sensing a presence signal from said vehicle when said vehicle is within a given block;
   second means for sensing the presence or absence of said vehicle within said given block;
   third means for providing a first control signal in response to said sensing of a presence signal from said vehicle by said first means concurrent with said second means sensing the presence of said vehicle;
   fourth means for storing a second control signal in response to said third means providing said first control signal; and
   fifth means responsive to the sensing of the absence of said vehicle in said given control block by said second means during the time said second control signal is stored for providing a third control signal.

3. The system of claim 2 wherein said third control signal is used for controlling the operation of other vehicles.

4. The system of claim 2 including means for discontinuing the storage of said second control signal by said fourth means a predetermined amount of time after the provision of said third control signal.

5. The system of claim 2, with each of said third and fifth means comprising AND signal logic gates.

6. The system of claim 5 with said AND signal logic gates each having first and second inputs and an output, and where a given signal applied to said first input is reproduced at said output when another signal is concurrently applied to said second input.

7. The system of claim 6 with said another signal which is applied to the second input comprising operating potential for the AND signal logic gate.

8. A method of controlling a vehicle traversing along a path divided into a plurality of control blocks, said method comprising the steps of:
   sensing a presence signal from said vehicle when said vehicle is within a given control block;
   sensing the physical presence or absence of said vehicle within the said given control block;
   storing a first signal indicative of said vehicle having been present in said given block in response to said sensing of said presence signal concurrent with the sensing of the physical presence of said vehicle within said given control block;
   providing a vehicle control signal in response to the physical absence of said vehicle in said given control block during the time said first signal is stored; and
   controlling the operation of other vehicles along said path in response to said vehicle control signal.

9. The method of claim 8, including the step of:
   discontinuing the storing of said first signal a predetermined amount of time after the provision of said vehicle control signal.

* * * * *